United States Patent [19]
Galtz

[11] Patent Number: 4,749,338
[45] Date of Patent: Jun. 7, 1988

[54] SIDE CHANNEL BLOWER

[75] Inventor: Ruediger Galtz, Munich, Fed. Rep. of Germany

[73] Assignee: Webasto-Werk W. Baier GmbH & Co., Gauting, Fed. Rep. of Germany

[21] Appl. No.: 48,535

[22] Filed: May 11, 1987

Related U.S. Application Data

[63] Continuation of Ser. No. 797,959, Nov. 14, 1985, abandoned.

[30] Foreign Application Priority Data

Dec. 21, 1984 [DE] Fed. Rep. of Germany ....... 3447007

[51] Int. Cl.$^4$ ............................................. F04D 27/00
[52] U.S. Cl. .................................................... 415/145
[58] Field of Search ....................... 415/52, 53 R, 53 T, 415/144, 145

[56] References Cited

U.S. PATENT DOCUMENTS

| | | | |
|---|---|---|---|
| 550,797 | 12/1895 | Marshall | 415/144 |
| 1,935,120 | 11/1933 | Hagen | 415/144 |
| 2,649,242 | 8/1953 | Payne | 415/145 |
| 2,834,534 | 5/1958 | Kadosch et al. | 415/144 |
| 2,963,863 | 12/1960 | Middlebrooks, Jr. | 415/144 |
| 3,352,536 | 11/1967 | Almquist | 415/144 |
| 3,796,511 | 3/1974 | Hansen | 415/144 |
| 3,928,848 | 9/1976 | Schonwald et al. | 415/53 T |
| 4,412,781 | 11/1983 | Abe et al. | 415/53 T |

FOREIGN PATENT DOCUMENTS

| | | | |
|---|---|---|---|
| 1282460 | 11/1968 | Fed. Rep. of Germany | 415/53 T |
| 594 | 1/1981 | Japan | 415/53 T |
| 397427 | 12/1966 | Switzerland | 415/145 |
| 2,104,959 | 3/1983 | United Kingdom | 415/53 T |
| 514120 | 6/1976 | U.S.S.R. | 415/53 T |

Primary Examiner—Robert E. Garrett
Assistant Examiner—John T. Kwon
Attorney, Agent, or Firm—Sixbey, Friedman & Leedom

[57] ABSTRACT

A side channel blower of the type used as a combustion air blower for motor vehicle heaters wherein a vaned impeller compresses air within a channel formed in a blower. The blower housing has an inlet opening and a discharge opening, between which there is a cross piece. In order to increase the compression pressure which can be achieved with the side channel blower, the inlet opening is in an axial plane and empties into the side channel in the direction of rotation of the impeller. Furthermore, the cross piece has a substantially uniform length in the circumferential direction of the flower and extends into close proximity to a boundary edge of the inlet opening that extends across the flow channel so that an axial projection of the inlet opening onto the plane of rotation of the impeller is as small as possible relative to the area of the inlet opening in the axial plane. To adjust the output of the blower, a bypass opening is provided in the wall of the side channel, at a point from approximately one-third to one-half the circumferential distance toward the inlet open from the discharge opening. In this way, a blow delivery characteristic can be achieved with the bypass opening open that is substantially directly proportional to that achieved with the bypass opening closed.

28 Claims, 4 Drawing Sheets

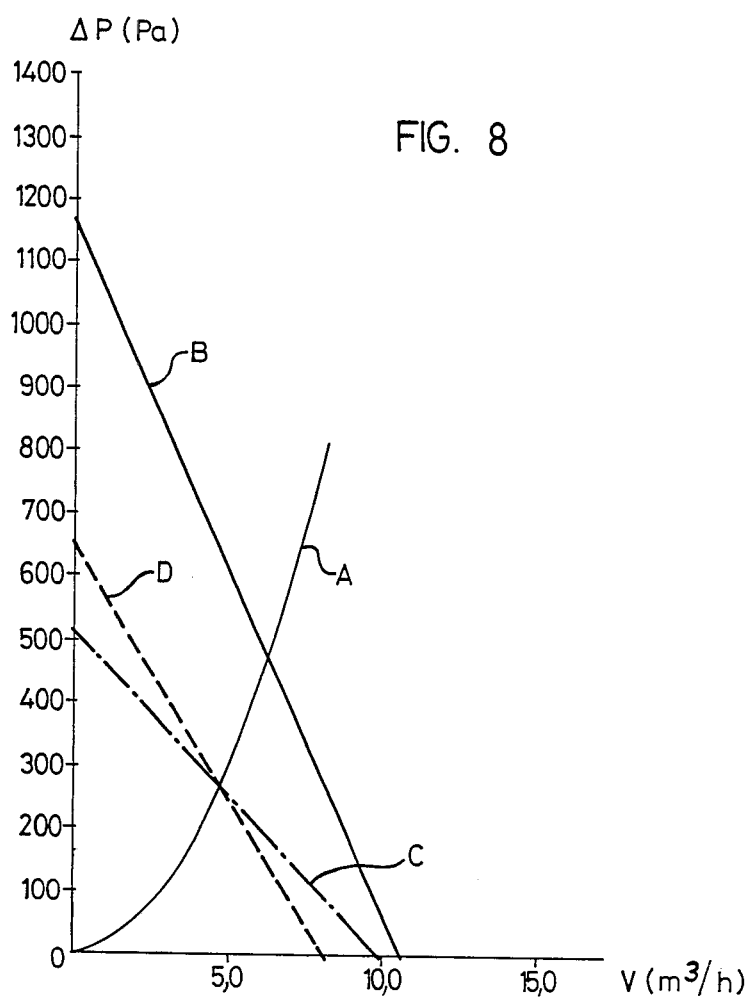

SIDE CHANNEL BLOWER

This application is a continuation of application Ser. No. 797,959, filed Nov. 14, 1985, now abandoned.

BACKGROUND AND SUMMARY OF THE INVENTION

The invention pertains to a side channel blower which is intended to be used, in particular, as a combustion air blower for motor vehicle heaters; such heaters can be designed as air heating devices or water heating devices.

German Pat. No. 31 44 787 and corresponding U.S. Pat. No. 4,456,423 describe a side channel blower of the type mentioned above which has a blower housing in which there is at least one side channel. Right next to the side channel is an impeller which has a number of vanes. The blower housing also has an inlet opening and a discharge opening which are connected to the side channel. Between the inlet side and the delivery side of the blower is a cross piece.

In a side channel blower of this type, the pressure which can be achieved with the side channel blower is proportional to the uncoiled length of the side channel. The circumferential lengths (projected onto the impeller) of the inlet and discharge openings and of the cross piece between the inlet and delivery sides of the blower have then be subtracted from this uncoiled length. The point is that compression is not possible in these areas.

If, as is usually the case, the inlet and discharge openings as well as the cross piece are relatively long in the circumferential direction, then approximately one-third to one-half of the uncoiled length of the side channel cannot be used for the actual compression process. Therefore, the pressure which can be achieved with such a side channel blower is not optimum.

The goal of the invention is thus to increase the outlet delivery pressure which can be achieved with such a side channel blower without increasing the overall dimensions of the side channel blower and/or raising the rpm.

A side channel blower in accordance with preferred embodiments of the invention is excellently suited to accomplishing this goal by virtue of the characteristics that, relative to the plane of a cross piece between the inlet and delivery sides of the blower, the inlet and outlet openings are on axial opposite sides of the blower housing and the inlet opening feeds into the side channel in the circumferential direction of impeller rotation.

In a side channel blower of the type encompased by the invention, the uncoiled side channel length which can be used for compression is increased by virtue of the fact that, the length of the inlet opening, projected onto the impeller and measured in the circumferential direction, is significantly reduced since it is only minimal in the circumferential direction and empties into the side channel in the impeller's direction of rotation. With respect to the plane of the cross piece, the discharge opening is also in an axially opposed position, on the other side of the blower housing relative to the cross piece. The effect of this is that the air which enters via the inlet opening is fed in the circumferential direction to the side channel in a way which promotes flow, thus improving the blower's efficiency, but at the same time the arrangement is fashioned in such a way that in the area of the inlet opening only a very small portion of the side channel's uncoiled length remains unused for the actual compression process. This means, surprisingly enough, an increase in the compression pressure which can be achieved with the side channel blower, without it being necessary to alter the basic dimensions of the blower housing and impeller and/or the impeller's speed.

Additionally, the size of the cross piece as measured in the circumferential direction of the blower housing is minimized since, in the invention's design, it is sufficient for the cross piece to bridge the gap between two successive vanes of the impeller. This minimum size of the cross piece thus amounts approximately to the distance between two successive vanes of the impeller with allowance for the angle ratios between the edges of the cross piece and the edges of the impeller vanes.

The uncoiled side channel length which cannot be used for the actual compression process in the area of the discharge opening is also reduced by having the discharge opening carry off the compressed air in a radial direction to deliver it for the use intended for it. Because of this further reduction in the side channel area which cannot be used for compression, the pressure which can be achieved with the side channel blower can be increased even more.

If the compressed air emerges from the side channel blower discharge opening in the circumferential direction, it is possible to reduce the unusable uncoiled side channel length in the area of the discharge opening as much as possible in order to achieve a higher overall side channel blower delivery pressure. In addition, when the compressed air is carried off in this way, the flow resistance in the area of the discharge opening is extremely slight so that the spiral flow hugs the walls of the side channel and can then be carried off in the impeller's direction of travel with no significant deflection.

If the directions in which both the inlet opening and the discharge opening empty lie in the circumferential direction, then it is advantageous to provide a partition between the delivery and inlet sides of the blower, this partition is designed to provide flow-improving guidance in the area of both the inlet opening and the discharge opening in the axial and/or radial directions.

In order to make sure that there is as little resistance as possible to the inlet and discharge of the air in the side channel blower of the invention, the inlet cross-section of the inlet opening and/or the discharge cross-section of the discharge opening is/are enlarged.

In order to avoid sacrificing some of the usable uncoiled side channel length in the case of the type of enlargement mentioned above, the inlet cross-section of the inlet opening is enlarged in the axial direction of the blower housing, so that while a relatively large volume can be provided via the expanded inlet crosssection of the inlet opening, at the same time there is no need to accept a corresponding reduction in the pressure which can be achieved with the side channel blower. Of course, the discharge opening can be designed in a similar way in the discharge area.

In addition, in a side channel blower having an adjustable bypass opening for regulating the blower output, in accordance with an embodiment of the invention, the bypass opening is placed directly in the wall of the side channel, and in this case, the bypass opening is as far away from both the inlet opening and the discharge opening as possible. This arrangement of the bypass opening simplifies not only the manufacture of a side channel blower of this type, since allowance can be made for this type of opening in the cast section of the blower housing itself, but it has also been found, surprisingly enough, that even when a bypass opening is opened to regulate output, there is a considerably steeper blower characteristic curve than is obtained with the previous designs of bypass controls, so that the upstream and downstream consumers in the overall system have hardly any further effect on the delivery of the blower and the delivery, thus, has a directly proportional relation to the delivery obtained when the bypass opening is closed, almost no matter what the behavior of the consumer is. Since in the case of the design of the side wall blower of the invention the bypass opening is relatively far from the blower discharge opening, in the area between the bypass opening and the blower discharge opening there still exists the possibility that the residual air present in this area in the side channel blower may be further compressed when delivery takes place. This explains, in the case of an open bypass opening, the blower characteristic curve's plot which, as regards steepness, is quite similar to the blower characteristic curve obtained with a closed bypass opening.

It has also been found to be advantageous to arrange the bypass opening in an area extending over one-half to two-thirds of the uncoiled length of the side channel, measured from the inlet opening. In this type of arrangement, approximately one-half to one-third of the length of the side channel is still available for further compression of, for example, the air in the side channel blower up to the discharge opening of the blower even when the bypass opening is open; this means that the blower characteristic curve will have a steeper plot than was the case with the previous bypass control systems. Preferably, the bypass opening is located approximately mid-way between the inlet opening and the discharge opening of the blower.

In order to ensure an adequate adjustment range for output regulation by the bypass opening of the invention, the size of the bypass opening is selected with respect to its location so that its size is inversely proportional to its distance from the blower inlet opening. Since the pressure in the side channel increases as the distance from the blower inlet opening increases, the bypass opening should thus be made larger the closer it is to the inlet opening in order to be able to draw off a large enough quantity of air to regulate the blower output, even when the pressure in the side channel blower is low. The further the bypass opening is from the blower inlet opening, however, the smaller it can be made. Thus, an advantageous compromise can be struck by arranging the bypass opening approximately mid-way between the inlet and discharge openings of the blower. This type of arrangement yields a bypass opening size which can be readily provided and which, in particular, causes no significant impairment of the strength of the blower housing.

In order to ensure that the bypass opening will have as large a clear cross-section as possible, it is given an oblong design.

In order, in the event of an open or even a partly open bypass opening, to guarantee that enough air will discharge via the bypass opening to regulate the system's output, the bypass opening is placed in the side channel wall in such a way that it points directly tangentially to the flow direction of the spiral flow in the side channel; in this case the spiral flow will hug the wall surface of the side channel formed in the blower housing, and with this type of arrangement the spiral flow can then be drawn off with very little resistance.

In accordance with preferred embodiments of a control for adjusting the opening cross-section of the bypass opening, in order to ensure easy access to this adjustment device, this control should be located on the front of the blower housing which faces toward the drive motor and faces away from the delivery output of the blower as well as from the impeller.

In order to keep the overall height for the control at the back of the blower housing as small as possible, a set screw is used as the adjustment control and is arranged parallel to or inclined with respect to the wall surface of the blower housing. Of course, the set screw control can also be arranged normal to this wall surface; this decision will depend on the space available in this area of the heater.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 8 shows a pressure-volume diagram to illustrate the blower characteristic curve plot with regulation in accordance with the invention and with the conventional type of bypass control.

DETAILED DESCRIPTION OF THE PREFERRED EMBODIMENTS

Figure 1:
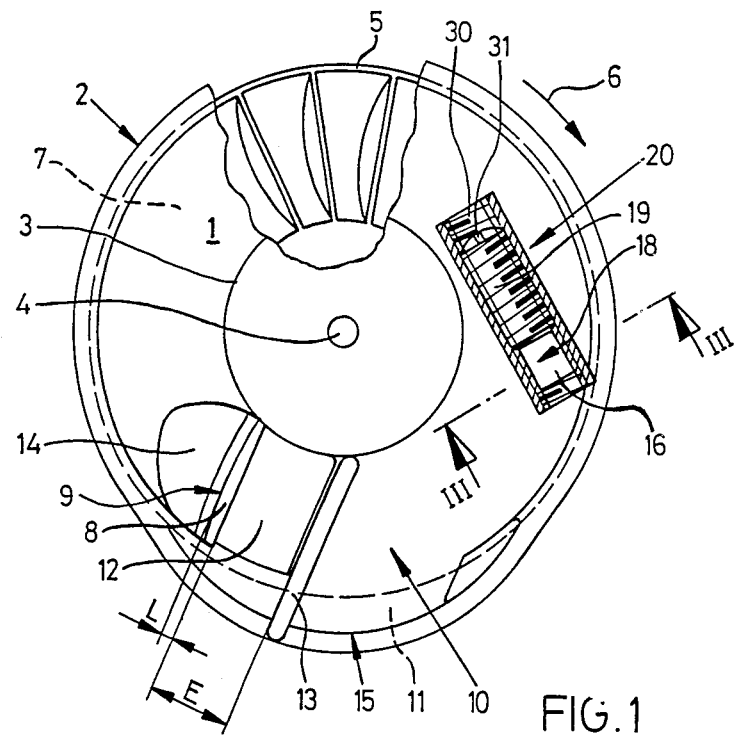
FIG. 1 shows a partially broken-away top view of a blower housing of a side channel blower in accordance with the invention.
Figure 2:
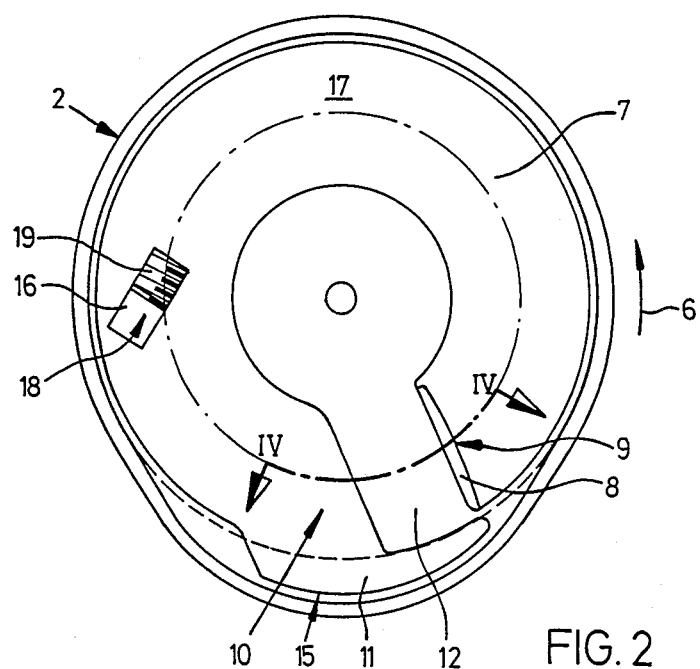
FIG. 2 shows a bottom view of the blower housing of the side channel blower shown in FIG. 1, without the impeller.

One way of designing a side channel blower is illustrated by FIGS. 1 and 2. In the top view shown in FIG. 1, the direction of view selected is toward the front 1 of a blower housing 2, which is preferably manufactured as a cast part, especially as a light-metal cast part. The number 3 indicates a drive motor which is attached on the front 1 of the blower housing 2 and the drive shaft of which is marked 4; on this shaft is an impeller 5, shown in FIGS. 1, 2 and 3. In FIGS. 1-4, the impeller's direction of rotation is indicated schematically by arrow 6. In blower housing 2 there is a side channel 7, which is also visible in the view given in FIG. 2 and the path of which is also depicted schematically in FIG. 1. Into side channel 7 runs an inlet opening 8, via which combustion air is aspirated when the side channel blower is used as a combustion air blower for motor vehicle heaters; this combustion air is then compressed, starting from an inlet side 9, in cooperation with the impeller 5 and its vanes, in the form of a spirally shaped flow until it reaches a delivery side 10 of the blower. In the area of delivery side 10, there is a discharge opening 11 which, in the design shown in FIGS. 1 and 2, extends radially outwardly from the side channel 7 so that, in the side channel 7, the spiral flow is drawn off in the direction of rotation 6 or direction of motion of the impeller 5 with no significant deflection until after it is within the discharge opening.

Between the inlet side 9 and the delivery side 10 of the side channel blower is a cross piece 12. This cross piece extends in the circumferential direction in such a way that it approximately corresponds to the distance between two successive vanes of the impeller 5. As FIGS. 1 and 2 show, viewed in the direction of rotation 6 of the impeller 5, the inlet opening 8 is located downstream of the cross piece 12 in the area of the blower inlet side 9, and the inlet opening 8 feeds the aspirated air to the side channel 7 in the blower's direction of rotation 6, i.e., in the circumferential direction. FIG. 1 also shows a partition 13 which is located between the delivery side 10 and the inlet side 9 of the blower in FIGS. 1 and 2; in this blower both the inlet opening and the discharge opening 11 point in the circumferential direction from portion 13 into the side channel 7. This partition 13 may be inclined in the radial and/or axial direction(s) and is shown projecting axially in FIG. 3 and inclined relative to a radial direction in FIG. 1. FIG. 1 shows, at 14, an enlargement of the inlet cross section of the inlet opening 8. This enlargement 14 extends in the axial direction of the blower housing 2, and the enlargement, 14, protrudes from the plane of projection of FIG. 1.

As FIGS. 1 and 2 also show, the discharge cross section of the discharge opening 11 is also enlarged in comparison with side channel 7 in order to make it possible, via discharge opening 11, to draw off the air compressed in side channel 7 with little resistance.

In addition, FIGS. 1 and 2 show a bypass opening 16, which serves to regulate the blower output. Bypass opening 16 is located in a wall 17 of the side channel 7, and specifically at a point which is away from both the inlet opening 8 and the discharge opening 11 of the blower housing 2. The bypass opening 16 can be located a distance of approximately one-half to two-thirds of the uncoiled length of the side channel 7 away from the inlet opening 8, and preferably, the bypass opening 16 should be approximately mid-way between the inlet opening 8 and the discharge opening 11. As a control for adjusting the cross-sectional area 18 of the bypass opening 16, FIGS. 1 and 2 show a set screw 19, which runs approximately parallel to the wall surface, such as the front 1 of the blower housing 2, or is inclined at a small angle thereto. The operation and function of this adjustable bypass opening 16 will be explained later.

In the side channel blower of the invention, which is presented and shown here, the length L of the inlet opening 8, as measured in the circumferential direction, is very small. In comparison with conventional side channel blowers, this increases the uncoiled length of side channel 7 which can be used for compression. Specifically, the pressure which can be achieved by such a side channel blower in compression is proportional to the uncoiled length of side channel 7. With the arrangement and design of the inlet opening 8 in accordance with the invention, the portion of the uncoiled length of side channel 7 which cannot be used at the inlet side 9 and the projection of the inlet opening 8 onto the plane of projection in FIGS. 1 or 2 for the actual compression process in side channel 7 is reduced as much as possible. Since, in addition, the inlet opening 8 feeds into the side channel 7 in the impeller's direction of rotation 6, the air entering via the inlet opening 8 is fed to the side channel 7 in the circumferential direction, i.e., in the direction of rotation, in such a way as to promote flow, thus making it possible to increase the blower's overall efficiency as well. Thus, without changing the basic dimensions of the blower housing 2 and without modifying the speed of the impeller, a higher compression pressure on the delivery side 10 is achieved in the side channel blower of the invention than in conventional blowers.

In addition, the size E of the cross piece 12, measured in the circumferential direction of the blower housing 2, is kept as small as possible in order to prevent cross piece 12 from keeping too much of the uncoiled length of side channel 7, which can be used for compression, from being available due to the arrangement of cross piece 12. The invention's design of the side channel blower is thus done in such a way that on both the inlet side 9 and the delivery side 10, as well as in the area of cross piece 12, as little of the uncoiled length of side channel 7 is left unused for the actual compression process so that the compression pressure which can be achieved with the side channel blower of the invention is optimized.

Figure 3:
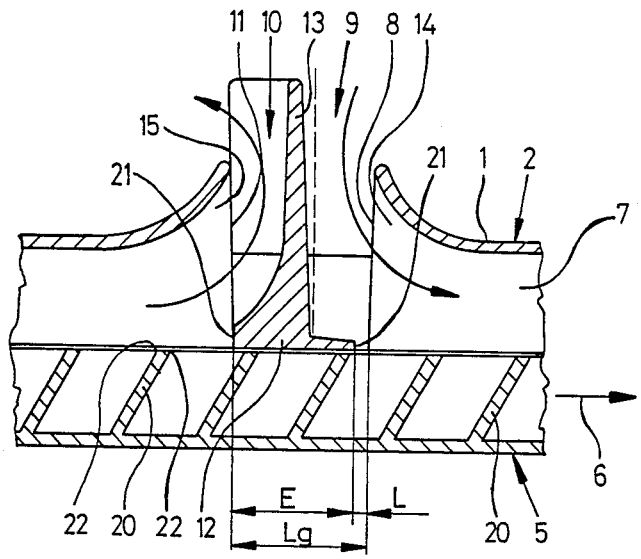
FIG. 3 shows a side cross-sectional view through a side channel blower in accordance with the invention in the area of the inlet and discharge of the side channel blower.

FIG. 3 shows a side view of the area around the inlet side 9 and the delivery side of the side channel blower shown in FIGS. 1 and 2. The same parts as in FIGS. 1 and 2, or ones similar to them, are given the same reference numbers. As shown, the impeller 5, which has a number of vanes, is arranged immediately adjacent to the blower housing 2. This impeller 5 turns in the direction of rotation 6 relative to the blower housing 2. Viewed in the direction of rotation 6 of the impeller 5, the inlet opening 8 lies downstream of the cross piece 12. The cross piece 12 is located between the inlet side 9 with the inlet opening 8 and the delivery side 10 with the outlet opening 11, and bridges approximately the area between two successive vanes 20 of the impeller 5. As indicated at 14, the inlet opening 8 is enlarged in the blower's axial direction so that through this enlargement 14 of the inlet opening 8 a relatively large volume can be introduced into the side channel 7, but the projection of the inlet opening 8 onto the impeller 5 in the circumferential direction has only a minimal length, which is subtracted from the extent of the side channel's uncoiled length which can be used for compression in the side channel. The size E of the the cross piece is also kept as small as possible so that, with allowance for the angle ration prevailing between the edges 21 of the cross piece 12 and the edges 22 of the vanes 20, the intermediate space between two successive vanes 20 of the impeller 5 reliably bridged.

In the area of the delivery side 10 of the side channel blower, the discharge opening 11 has an enlarged cross-sectional area portion 15 in order to make it possible to draw off the air compressed in the side channel blower with as little loss as possible. The discharge opening 11 draws the compressed air out of the side channel 7 in the circumferential direction, i.e, in the direction of rotation 6 of the impeller 5.

If, as shown in FIG. 3, both the inlet opening 8 and the discharge opening 11 open in the circumferential direction, FIG. 3 shows the partition 13, which is located between the delivery side 10 and the inlet side 9. This partition 13 is inclined (relative to the axial plane represented by a broken line in the axial and/or radial direction(s) in order to ensure that the air will be channeled on the inlet side 9 and the delivery side 10 with little resistance.

FIG. 3 shows in particular that, due to construction of the cross piece 12, the inlet opening 8 and the outlet opening 11, only an extremely small part of the actual uncoiled length of the side channel 7 cannot be used for compression in the side channel 7; viewed in the circumferential direction or the direction of rotation 6, this path has a total length of $L_g$ which is subtracted from the total usable uncoiled length of the side channel blower of the invention, it is thus ensured that as much of the uncoiled length as possible is available for compression in the side channel 7.

Figure 4:
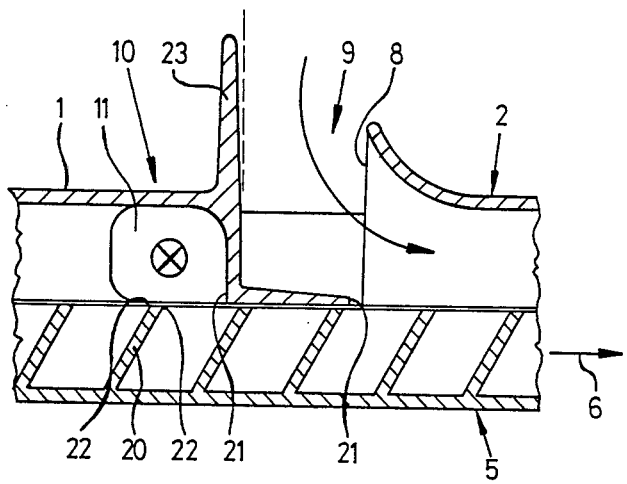
FIG. 4 shows a cross-sectional view along Line IV—IV in FIG. 2.

FIG. 4 shows an alternative embodiment for a side channel blower which, in contrast to the design in FIGS. 1-3, has such a design that, in the area of the delivery side 10 of the blower housing 2, the discharge opening 11 opens into the side channel 7 in a radial direction, instead of in the circumferential direction. With this design, the upright partition 13 in FIG. 3 can be eliminated, and an axial extension 23 used that serves only as a guide for the aspirated air in the area of the inlet side 9 of the side channel blower. With the design of a side channel blower as shown in FIG. 4, essentially the same advantages are achieved with regard to increased delivery pressure as with the first embodiment mentioned above.

Figure 5:
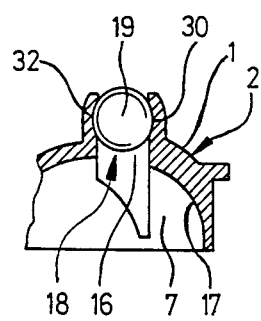
FIG. 5 shows a cross-sectional view through the blower housing along Line III—III in FIG. 1.

Referring to FIGS. 1 and 2, in connection with FIG. 5, a first, preferred version of the design of a bypass control to regulate the output in a side channel blower is explained in detail. The bypass opening 16 in FIGS. 1 and 2 is located in the wall 17 of the side channel 7 in blower housing 2. The bypass opening 16 is located away from both the inlet opening 8 and the discharge opening 11. By preference, the bypass opening 16 should be located in an area of the side channel 7 which is approximately one-half to two-thirds of the uncoiled length of side channel 7. The bypass opening 16 is oblong in shape and, in the version shown, has an approximately rectangular open cross-sectional area 18. To adjust the open cross-sectional area 18 of the bypass opening 16, in FIG. 5, there is a set screw 19 which is located on the front 1 of the blower housing 2, running parallel to or, in certain cases, at a slight angle to it. The set screw 19 sits in the threads 30 incised in bypass opening 16, and with the aid of a tool which is inserted into a slit 31 in the set screw 19, set screw 19 will turn along the threads 30 and adjust in such a way that it will increase or decrease the cross-sectional area 18 of the bypass opening 16 to achieve a desired output adjustment in each particular case. In order to ensure that the set screw 19 will be properly guided by the threads 30, as FIG. 5 shows, there are two runners 32 on the front 1 of blower housing 2; these runners partially enclose the bypass opening 16.

Since the bypass opening 16 can be formed right in the cast part of the blower housing 2, even with the runners 32, the manufacture of such a side channel blower is simplified. In the invention's design of the side channel blower, the bypass opening is located relatively far away from the discharge opening 11 so that the residual air which is present in the area between the bypass opening and the discharge opening 11 of the side channel blower and which is not discharged when the bypass opening 16 is open can continue to undergo compression until it reaches the discharge opening 11.

This means that, even when the discharge opening 16 is open, the blower curve overall has a plot and a steepness which are similar to those of the blower characteristics obtained when the bypass opening 16 is closed. This is further explained below.

In the design and arrangement of the bypass opening 16 in the side channel blower, allowance should be made for the fact that the pressure in the side channel 7 increases as the distance from the inlet opening 8 in the side channel 7 increases. Therefore, the open cross-sectional area 18 of the bypass opening 16 must be made larger, the closer it is to inlet opening 8 or, the other way around, the open cross-sectional area can be made smaller if the bypass opening 16 is closer to the blower discharge opening 11. The reason why these steps are taken is that, in order to achieve an adequate range of adjustment to regulate output, in each of the side channel blower's operating states, it is necessary that, regardless of the pressure in the side channel 7, it always be possible to draw off, via the bypass opening 16, enough air for control purposes. A good compromise between the size and the arrangement of the bypass opening 16 is achieved when the bypass opening 16 is placed approximately mid-way between the inlet opening 8 and the discharge opening 11 of the blower. In this case the bypass opening 16 then will have an open cross-sectional area 18 of such a size that there will be no significant problems in the manufacture of the blower housing 2 and, in particular, its strength will not be impaired.

Of course, the shape of the opening cross-section 18 of the bypass opening 16 does not necessarily have to be rectangular; the opening cross-section 18 can also be oval, as well as a combination of a rectangle and an oval and/or a circle.

As FIG. 5 shows, unlike in FIG. 1, the bypass opening 16 in the wall 17 of the side channel 7 can be arranged in such a way that it points directly tangentially to the flow direction of the spiral flow in side channel 7. In this type of design, the air can be drawn off via the bypass opening with little resistance, and in particular a relatively large amount of air can escape since this design places the spiral flow at the wall surface 17 of the side channel 7 while the side channel blower is in operation and the bypass opening is provided in the side channel 7 as a direct continuation of the flow path of the spiral flow.

Figure 6:
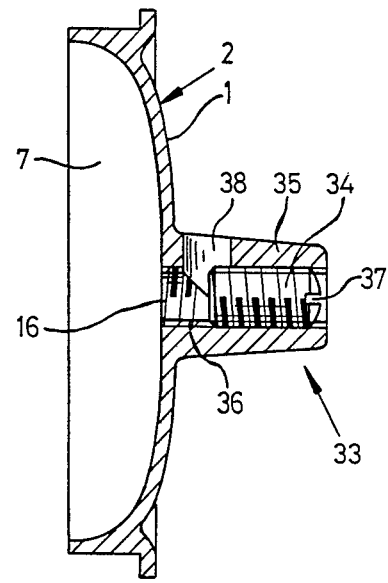
FIG. 6 shows a cross-sectional view similar to FIG. 5 of an alternative design with a bypass opening and a control.
Figure 7:
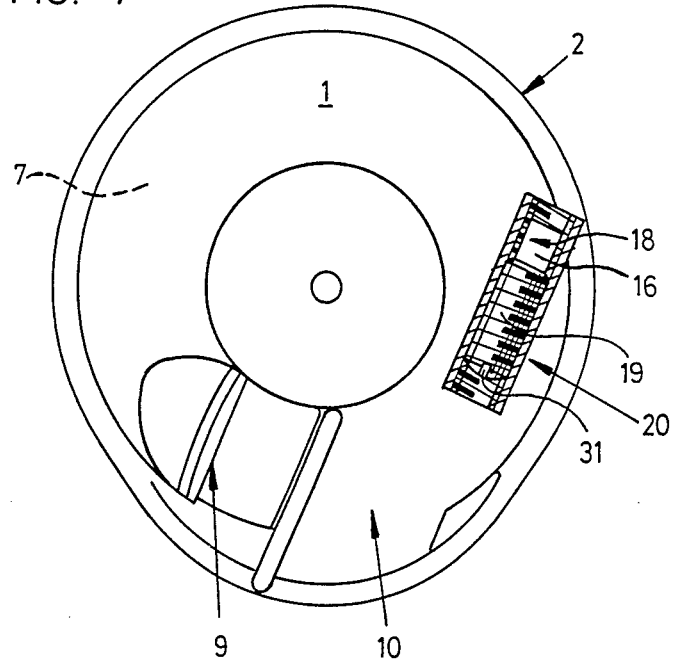
FIG. 7 shows a view similar to that in FIG. 1 of an alternative design for a side channel blower with a bypass opening.

FIG. 6 shows a version of the design of a bypass adjustment device, which is marked overall with the number 33. In this control device, unlike the set screw 19 in the previous figures, the set screw 34 is not approximately parallel to the wall surface of the front 1 of the blower housing 2; rather it runs approximately perpendicular to this wall surface, which is formed by the front 1 of the blower housing 2. In this case, there is a projecting runner 35, which should be cylindrical in shape and which has a threaded hole 36 running through it. The thread of the set screw 34 then engages in this threaded hole, and the set screw can be turned in the threaded hole 36 to adjust the device using a tool which is inserted into the slit 37 in the screw. At approximately the level of the front 1 of the blower housing 2, the runner 35 has a groove 38 which, in the position of the set screw 34 shown in FIG. 6, is in contact with the bypass opening 16 which is located in the wall 17 of the side channel 7. Then, via this groove 38 and in accordance with the position of the set screw 34, air escapes via bypass opening 16 from the side channel 7 to the environment, and a controlled connection is created between the inlet side 9 and the delivery side 10 of the side channel blower. Of course, the design of the control 33 and/or the set screw 19 or 34 can be modified in such a way that the invention's purpose of varying the opening cross-section 18 to adjust output is achieved. The corresponding arrangement can then be adapted to the prevailing conditions of use of a given side channel blower and, in particular, on the basis of the available installation space.

The P-V diagram, in FIG. 8, depicts the operating curve of an air consumer (e.g., a combustion chamber) marked A, the characteristic of a side channel blower with a closed bypass marked B, the characteristic of a conventional bypass control with the bypass open marked C and the characteristic of the invention with bypass opening 16 open marked D. These diagrams show that the characteristic marked D of the invention, when bypass opening 16 is open, has a similar plot to that of characteristic marked B of the invention when bypass is closed, with respect to steepness. This means that in the overall system upstream or downstream changes have hardly any effect on the delivery output characteristics of the blower, so that reliable output control is achieved since, in the invention, because as indicated by the characteristic D, the delivery output with bypass opening 16 open is directly proportional to the delivery output when bypass opening 16 is closed. The blower characteristic of curve C, on the other hand, is flatter since the open bypass opening causes a reduction in the overall resistance of the system. Thus, the upstream or downstream changes present in the overall system in accordance with the conventional characteristic C, due to sound dampers, pipelines, etc., have a great effect on the delivery output characteristics of the blower, thus resulting in problems with regard to precise control of output.

I claim:

1. Side channel blower, of the type for use as a combustion air blower for motor vehicle heaters, comprising a blower housing in which a side channel is located laterally directly adjacent to a rotatable impeller with several circumferentially spaced vanes, an inlet opening and a discharge opening for the side channel located on opposite sides of a cross piece, wherein, as a means for increasing blower efficiency by maximizing the circumferential extent of the channel usable for compression, the inlet opening has a flow-through area through which air flows into the side channel that extends essentially in an axial plane facing into the side channel in the direction of rotation of the impeller, said cross piece has a substantially uniform length (E) in the circumferential direction of the blower and extends into close proximity with a boundary edge of the inlet opening extending across the flow channel so that an axial projection of the area of the inlet opening onto the plane of rotation of the impeller is as small as possible relative to an area of the inlet opening within said axial plane, and the cross piece has a maximum length (E) in the circumferential direction of the side channel that corresponds approximately to the spacing between a pair of successive vanes of the impeller, and an adjustable bypass opening to regulate the output of the blower, wherein the bypass opening is in a wall of the side channel at a location displaced from both inlet and the discharge opening.

2. Side channel blower of claim 1, wherein the discharge opening extends radially from the side channel.

3. Side channel blower of claim 1, wherein the discharge opening draws from the side channel in a circumferential direction.

4. Side channel blower of claim 3, wherein an axially and radially extending partition is located between the inlet and delivery sides of the blower.

5. Side channel blower of claim 1, wherein the cross section of at least one of the inlet opening and the discharge opening is enlarged.

6. Side channel blower of claim 5, wherein the inlet cross section of the inlet opening is enlarged in the axial direction of the blower housing.

7. Side channel blower of claim 1, wherein the bypass opening is located at a distance approximately one-half to two-thirds of the uncoiled length of the side channel away from the inlet opening.

8. Side channel blower of claim 7, wherein the bypass opening is located approximately mid-way between the inlet opening and the discharge opening.

9. Side channel blower of claim 7, wherein the bypass opening is oblong.

10. Side channel blower of claim 7, wherein the bypass opening is arranged tangentially to the side channel in the direction of flow.

11. Side channel blower of claim 7, wherein a controller is provided to adjust the open cross-sectional area of the bypass opening.

12. Side channel blower of claim 11, wherein the controller is a set screw which is located on the front of the blower housing.

13. Side channel blower of claim 12, wherein the set screw is located parallel to a wall surface of the blower housing containing said side channel.

14. Side channel blower of claim 12, wherein the set screw is located at an angle to a wall surface of the blower housing containing said side channel.

15. A side channel blower according to claim 1 is constructed as a means for producing a blower delivery characteristic with said bypass opening open that is substantially directly proportional to the blower delivery characteristic with said bypass opening closed, and wherein said adjustable bypass opening is provided in a wall of the blower defining the side channel at a location that is circumferentially displaced from the inlet opening toward the outlet opening in a direction of air flow within the side channel, and enables air to escape directly from the side channel to the exterior of the blower housing approximately.

16. The side channel blower of claim 15, wherein the bypass opening is located approximately midway between the inlet opening and the discharge opening.

17. The side channel blower of claim 15, wherein the bypass opening is oblong in design.

18. The side channel blower of claim 17, wherein the bypass opening is arranged tangentially to the side channel in the direction of flow.

19. The side channel blower of claim 18, wherein a controller is provided for adjusting the open cross-sectional area of the bypass opening.

20. The side channel blower of claim 19, wherein the controller is a set screw located on the front of the blower housing.

21. The side channel blower of claim 20, wherein the set screw is parallel to a wall surface of the blower housing containing the side channel.

22. The side channel blower of claim 20, wherein the set screw is set at an angle to a wall surface of the blower housing containing the side channel.

23. The side channel blower of claim 20, wherein the set screw extends approximately perpendicularly to a wall surface of the blower housing containing the side channel.

24. The side channel blower of claim 15, wherein a controller is provided for adjusting the open cross-sectional area of the bypass opening.

25. The side channel blower of claim 24, wherein the controller is a set screw located on the front of the blower housing.

26. The side channel blower of claim 25, wherein the set screw is parallel to a wall surface of the blower housing containing the side channel.

27. The side channel blower of claim 25, wherein the set screw is set at an angle to a wall surface of the blower housing containing the side channel.

28. The side channel blower of claim 25, wherein the set screw extends approximately perpendicularly to a wall surface of the blower housing containing the side channel.

* * * * *